(12) United States Patent
Fernback et al.

(10) Patent No.: US 9,062,464 B2
(45) Date of Patent: *Jun. 23, 2015

(54) SHEET GOODS HAVING A LARGE REPEAT LENGTH AND TILE WITH NUMEROUS PATTERNS

(71) Applicant: Armstrong World Industries, Inc., Lancaster, PA (US)

(72) Inventors: Katharine C. Fernback, Columbia, PA (US); Kean M. Anspach, Quarryville, PA (US); John R. Eshbach, Mariettta, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,834

(22) Filed: Jul. 29, 2013

(65) Prior Publication Data

US 2014/0162002 A1 Jun. 12, 2014

Related U.S. Application Data

(62) Division of application No. 12/283,843, filed on Sep. 16, 2008, now Pat. No. 8,496,779.

(51) Int. Cl.
| | |
|---|---|
| *B32B 3/00* | (2006.01) |
| *E04F 15/10* | (2006.01) |
| *B32B 27/08* | (2006.01) |
| *B32B 27/16* | (2006.01) |
| *B32B 27/20* | (2006.01) |
| *B32B 38/14* | (2006.01) |
| *B32B 38/00* | (2006.01) |
| *B41M 3/18* | (2006.01) |

(52) U.S. Cl.
CPC ............ *E04F 15/10* (2013.01); *Y10T 428/18* (2015.01); *Y10T 428/13* (2015.01); *Y10T 428/24802* (2015.01); *Y10T 428/16* (2015.01); *B32B 27/08* (2013.01); *B32B 27/16* (2013.01); *B32B 27/20* (2013.01); *B32B 38/14* (2013.01); *B32B 38/145* (2013.01); *B32B 2419/04* (2013.01); *B41M 3/18* (2013.01)

(58) Field of Classification Search
CPC .................................. B32B 38/145; B41F 5/08
See application file for complete search history.

(56) References Cited

U.S. PATENT DOCUMENTS

| | | | |
|---|---|---|---|
| 4,549,928 | A | 10/1985 | Blanding et al. |
| 4,579,610 | A | 4/1986 | Kole et al. |

(Continued)

FOREIGN PATENT DOCUMENTS

| | | |
|---|---|---|
| DE | 19534651 A1 | 3/1997 |
| EP | 0764523 A1 | 3/1997 |

OTHER PUBLICATIONS

Search Report for corresponding TW Application No. 98125678, completed Nov. 25, 2014. TW.

*Primary Examiner* — Elizabeth Mulvaney
(74) *Attorney, Agent, or Firm* — Amy M. Fernandez

(57) ABSTRACT

Sheet goods having extremely long repeat lengths and tiles having a large number of different visual patterns are formed by printing two different print patterns having different repeat lengths. The two different print patterns are printed on two films that are laminated together, or on a substrate, or one print pattern on a substrate and one print pattern on a transparent or translucent film that is laminated to the printed substrate.

17 Claims, 3 Drawing Sheets

(56) References Cited

U.S. PATENT DOCUMENTS

| | | |
|---|---|---|
| 4,690,720 A | 9/1987 | Mack |
| 5,304,272 A | 4/1994 | Rohrbacker et al. |
| 5,670,237 A | 9/1997 | Shultz et al. |
| 5,804,285 A | 9/1998 | Kobayashi et al. |
| 5,891,564 A | 4/1999 | Shultz et al. |
| 5,961,903 A | 10/1999 | Eby et al. |
| 6,444,072 B1 | 9/2002 | Weder |
| 6,983,686 B2 | 1/2006 | Vaughn et al. |
| 7,288,310 B2 | 10/2007 | Hardwick |
| 7,418,903 B2 | 9/2008 | Liang et al. |
| 2005/0153100 A1 | 7/2005 | Zoller et al. |
| 2005/0249924 A1* | 11/2005 | Reichwein et al. ......... 428/195.1 |
| 2007/0068404 A1 | 3/2007 | Hirahara et al. |
| 2007/0209736 A1* | 9/2007 | Deringor et al. .............. 144/363 |
| 2009/0305009 A1 | 12/2009 | Meersseman et al. |

\* cited by examiner

SHEET GOODS HAVING A LARGE REPEAT LENGTH AND TILE WITH NUMEROUS PATTERNS

The present invention relates to a method of making surface coverings, including tile and sheet goods, the surface coverings made by the method, and cartons of the tiles made by the method. The tiles have a large number of printed patterns or visuals and the sheet goods have an extremely long repeat pattern. More particularly, the invention is directed to a method of making surface coverings using at least two printers with different repeat lengths. For example, in rotogravure printing, the print cylinders would have different circumferences. The print cylinders or other printers, such as flexographic and offset lithography, may print different patterns on two different films that are then laminated together or the different print patterns may be printed on the same substrate.

BACKGROUND OF THE INVENTION

It is known to print surface coverings, such as sheet goods and tiles, with two or more print layers. The surface coverings are made by printing the print layers on one or more elongated sheets. If the surface covering is a plurality of tiles, the elongated sheet is cut to form a plurality of tiles.

With the rotogravure printing process, each color is printed with a separate print cylinder. To obtain sharpness and clarity in the printed pattern, the print cylinders are made with the same repeat length and the successive print cylinders are aligned so that the printed patterns precisely aligned to yield a sharp image.

The print cylinders that are presently used in the industry have lengths of about 40" and circumferences of about 24" or 36". Therefore, if the printed pattern of the surface covering is an image of tiles measuring approximately 12"×12", the print cylinders produce a maximum of 6 or 9 different 12"×12" printed patterns that may be cut to form 6 or 9 tiles having different printed patterns.

The tiles are typically put in cartons directly from the cutting line. Therefore, 2 or 3 different tiles are packed into each carton and the customer is told to mix the tiles from different cartons. Even if the tiles are mixed prior to packing in the cartons, each carton can contain a maximum of 6 or 9 differently patterned tile. Depending on the thickness of the tiles and the size of the tiles (12"×12", 16"×16" or 18"×18", for example), a carton may contain 14, 30 or 45 tiles, for example.

When a floor is laid with the tiles, it is fairly easy to find the repeat patterns by locating a distinctive image relative to the edges of one tile and finding the same distinctive image relative to the edges on another tile. It would be advantageous to avoid this pattern repeat.

If the surface covering is a sheet good, the repeat length of the pattern is determined by the circumference of the print cylinder or about 24" or 36". Again, it is fairly easy to find the repeating pattern in a floor laid with the sheet good.

Tile measuring 16"×16" are made with print cylinders having 32" or 48" circumferences. Again, since the cylinders are no more than 40" in length, 4 or 6 different tile patterns are produced and the repeat length of sheet goods with a 16"×16" tile pattern would be 32" or 48".

SUMMARY OF THE INVENTION

In a preferred form of the invention, a surface covering is made by printing at least two print layers. At least two of the print layers forming a printed pattern have different repeat lengths. The print layers may be printed on the same substrate, or on two separate films that are laminated together, or on a substrate and a film that are laminated together.

If the surface covering is a rotogravure printed sheet good, the repeat length will depend on the circumference of the print cylinders and the difference in the circumference of the print cylinders. If the difference in the circumference of the print cylinder is only a small percentage of their circumferences, the repeat length can be extremely long. For example, if circumferences of the print cylinders were about 24" and the difference in the circumferences were 0.5", the repeat length would be about 48 times the circumference or about 96 feet.

The present invention also, includes the surface covering made by the method. The surface covering may be a sheet good having an extremely long repeat length or a plurality of tiles having more than nine different printed patterns.

Another preferred form of the invention is a carton of tiles, in which the tiles have at least nine different printed patterns.

DETAILED DESCRIPTION OF THE INVENTION

Figure 1:
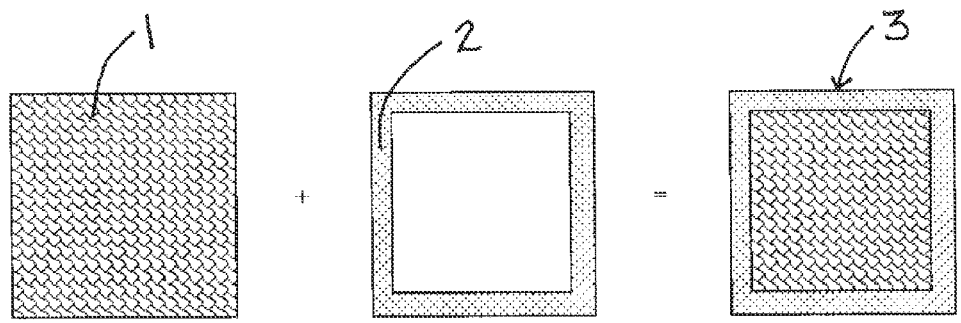
FIG. 1 is a schematic representation depicting the combination of a stone or slab pattern and a grout line pattern to form a slab tile pattern with a grout line surrounding the slab pattern.

As shown in FIG. 1, two print patterns 1, 2 can be combined to form a third print pattern 3. In the example of FIG. 1, stone or slab pattern 1 is combined with a grout pattern 2 to form a stone and grout line pattern 3, wherein the grout pattern 2 forms a boundary around the slab pattern 1. In one preferred embodiment, the grout pattern 2 is opaque so that the stone or slab pattern 1 cannot be seen through the grout pattern 2.

Figure 2:
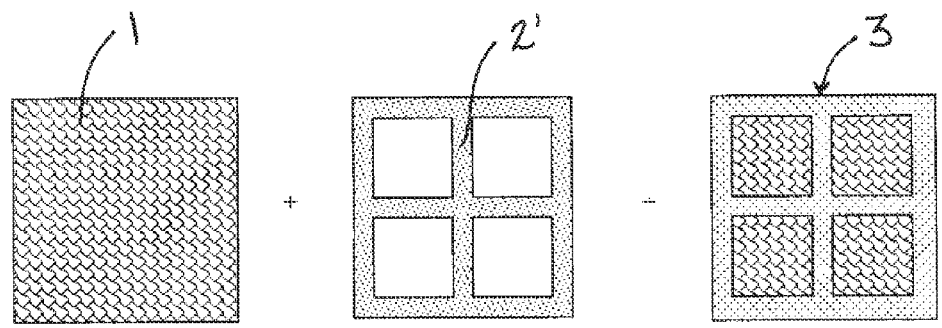
FIG. 2 is a schematic representation depicting the combination of a stone or slab pattern and a grout line pattern to form a slab tile pattern of four tiles with a grout line surrounding the slab patterned tiles.

In another embodiment, shown in FIG. 2, the stone or slab pattern 1 is combined with the grout pattern 2' to form a stone and grout pattern 3'. In this embodiment, the grout pattern 2' forms four smaller slab patterns. Again, the grout pattern 2 may be opaque so that the stone or slab pattern 1 cannot be seen through the grout pattern 2.

Figure 3:
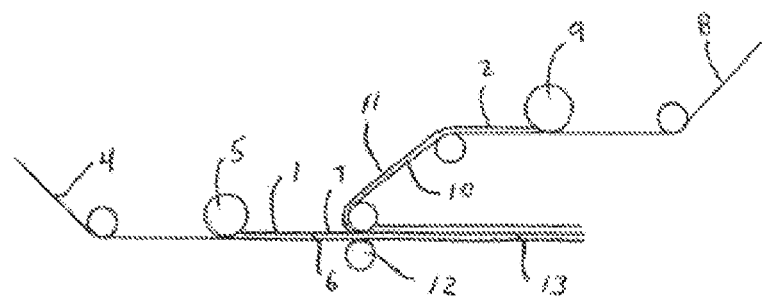
FIG. 3 is a schematic representation of a method of making an elongated sheet formed from two films with two print layers interposed between the two films.
Figure 4:
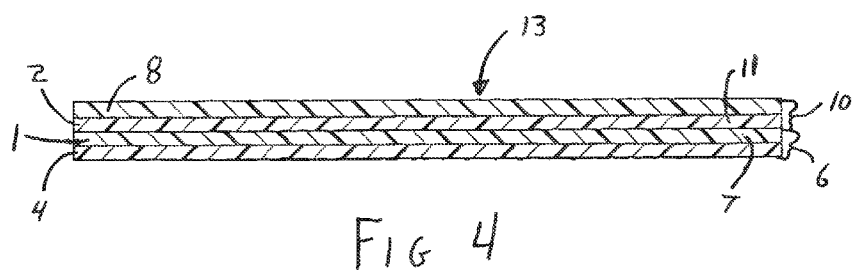
FIG. 4 is a side view of the elongated sheet of FIG. 3, not to scale.

Referring to FIGS. 3 and 4, the stone or slab pattern 1 is printed on a white or transparent or translucent film 4 with rotogravure cylinders 5 and forms a printed film 6 including a print layer 7 on the white film 4. The white pigment forming the white film 4 can be distributed throughout the white film 4 or printed on one surface of the white film 4. The grout pattern 2 is printed on a clear transparent or translucent film 8 with rotogravure cylinders 9 and forms a printed film 10 including a print layer 11 on the clear film 8. The two printed films 6, 10 are laminated together in laminator 12 to form a printed sheet 13.

Preferably, the two printed films 6, 10 are laminated together with the print layers 7, 11 adjacent. If it is desired for the two printed patterns 1, 2 to visually move relative to one another, the two printed films 6, 10 can be laminated together with the clear film 8 interposed between the two print layers 7, 11.

The laminated and printed sheet 13 can be laminated onto a surface covering substrate or otherwise used in the manufacture of a surface covering, as is known in the art. Once laminated to the substrate, the sheet may be cut into tiles.

The slab pattern 1 on the rotogravure cylinder 5 is continuous, i.e., there is no break in the pattern around the circumference of the rotogravure cylinder 5. To be able to print patterns with 12"×12" grout lines or 6"×6" grout lines, the rotogravure cylinder 9 may have a circumference of 24" or 36". To form tiles, the printed sheet is cut along grout lines that are spaced 12" apart. To form 16"×16" tiles or sheet good with a 16"×16" tile pattern, the rotogravure cylinder 9 would have a 32" or 48" circumference.

Since the rotogravure cylinder 9 can be about 36" to 40" in length, each revolution of the rotogravure cylinder 9 will produce 6 or 9 12"×12" tile images, or 4 or 6 16"×16" tile images, depending on the circumference of the rotogravure cylinder 9. If the repeat length of the rotogravure cylinders were the same, each revolution of the rotogravure cylinders would produce the same 6 or 9, or 4 or 6, tile images, i.e., there would be only 6 or 9, or 4 or 6, different tile patterns.

However, by making the repeat length of the rotogravure cylinders 5, 9 different, the number of different tile images multiplies many-fold. Since the two printed films 6, 10 have different repeat length, as the two printed films 6, 10 are laminated together, the grout pattern 2 migrates or walks down the length of the slab pattern 1. If the rotogravure cylinder 5, which prints the slab pattern 1, has a circumference of 23.5" and the rotogravure cylinder 9, which prints the grout pattern 2, has a circumference of 24", the rotogravure cylinder 5 must rotate 51 times before the grout line image of the rotogravure cylinder 9 would align in at the same position of slab image of the rotogravure cylinder 5. However, since the rotogravure cylinder 9 prints two rows of two grout patterns 2 per revolution, the leading grout line of the rotogravure cylinder 9 would print on the same position of the slab image of the rotogravure cylinder 5 as the grout line in the middle of the grout line pattern 2 after 25 revolutions of the rotogravure cylinder 9. Therefore, if the slight difference in images of the individual grout lines is ignored, a similar image would be printed after 25 revolutions of the rotogravure cylinder 9 and the repeat length is 24×12"=288" or 24 feet.

Therefore, rather than producing 6 different 12"×12" tile images, the rotogravure cylinders 5, 9 will produce (6×24 =) 144 substantially different 12"×12" tile images. Again, this ignores the differences in the images of the individual grout lines and only considers the slab patterns within the grout line patterns. If the rotogravure cylinders 5, 9 are used to produce sheet goods, the pattern will substantially repeat every 576" or 48 feet. If the sheet is cut into tiles, 144 tiles having substantially different images would be produced.

If the rotogravure cylinders 5, 9 were 35.5" and 36" in circumference and 12"×12" tiles images were printed, the repeat length of substantially the same image would be 36"×24=864" or 72 feet, again ignoring the differences in the images of the individual grout lines. If tiles were cut from the sheet, (9×24 =) 216 tiles having substantially different images would be produced.

If the image of the rotogravure cylinder 9 did not repeat within the pattern printed by the rotogravure cylinder 9, as does the 12"×12" grout line pattern 2, the repeat length of the pattern formed by the rotogravure cylinders 5, 9 would equal the circumference of the larger cylinder times the circumference of the larger cylinder times divided by the difference in circumference of the two cylinders. For two cylinders having circumferences of 24" and 23.5", the repeat length would be 24"×24"/0.5"=1152" or 96 feet. If 12"×12" tile were cut from the sheet, which is about 36" in length, 3 tiles per length of the cylinder times 1152" of repeat length divided by 12" in length per tile equals 288 different tiles.

However, if the circumference of the rotogravure cylinders is different than a multiple of the length of the tile and the circumference of the rotogravure cylinders are different, the number of different tiles would increase by factor of the reciprocal of the difference between the tile length and the circumference of the larger cylinder. For example, if the cylinders are 36" in length and have circumference of 23" and 23.5", and the cut tiles are 12"×12", the number of different tiles would be 3 tiles per length of the cylinders times the reciprocal of the length of the tile times the circumference of the larger cylinder times the circumference of the larger cylinder times the reciprocal of the difference in circumference of the two cylinders times the reciprocal of by the difference in the circumference of the larger cylinder and a multiple of the length the tile times the length of the tile (3 ×(1/12)×23.5× 23.5×(1/0.5)×(1/0.5)×12)=6,627 tiles If 16"×16" tile images are produced, the results are similar. The repeat length for sheet goods would be 32×31.5"=1008" or 84 feet with the rotogravure cylinder 5, which prints the slab pattern 1, having a circumference of 31.5" and the rotogravure cylinder 9, which prints the grout pattern 2, having a circumference of 32", or 48×47.5"=2280" or 190 feet with the rotogravure cylinder 5, which prints the slab pattern 1, having a circumference of 47.5" and the rotogravure cylinder 9, which prints the grout pattern 2, having a circumference of 48". The number of substantially different tiles would be 4×32=128 or 6×32=192 for rotogravure cylinder 9 having 32" or 48" circumferences, respectively.

Two clear films may be substituted for the white film 4 and clear film 8, in which case the two films can be laminated together with the two films interposed between the two print layers, or the two print layers can be interposed between the two films, or one print layer can be interposed between the two films and one film interposed between the two print layers. Also, both sides of the same clear film may be print upon.

Figure 5:
FIG. 5 is a schematic representation of a method of making an elongated sheet having a substrate and two print layers.
Figure 6:
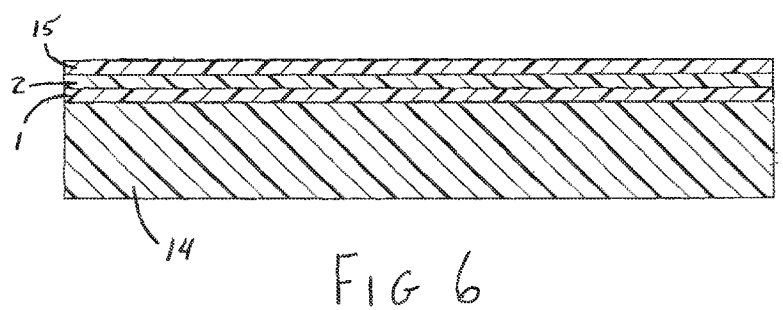
FIG. 6 is a side view of the elongated sheet of FIG. 5, not to scale.

Referring to FIGS. 5 and 6, in another embodiment, the slab pattern 1 is printed onto a surface covering substrate 14 with rotogravure cylinder 5 and then the grout pattern 2 is printed over the slab pattern 1 with rotogravure cylinder 9 forming the stone and grout line pattern 3. A wear layer 15 may be applied to the stone and grout line pattern 3. A clear layer may be interposed between the slab pattern 1 and the grout pattern 2. Again, the surface covering sheet may be cut into tiles along the some or all of the grout lines.

The invention is described with the printed patterns being a stone or slab pattern 1 and a grout pattern 2. However, the invention is not limited to such patterns. The patterns could be two or more overall patterns, such as two or more fanciful patterns or two or more different veining patterns, for example, in which case the pattern nearest the exposed surface of the surface covering may be translucent.

The invention is not limited to rotogravure printing. Other forms of printing that can be used include flexography and offset lithography, as long as at least two of the print patterns have different repeat lengths.

The invention claimed is:

1. A surface covering comprising:
two print layers printed from at least two cylinders, each of the cylinders having different circumferences and having different image dimensions;
a first print layer forming a first printed pattern and a second print layer forming a second printed pattern, the first printed pattern having a different repeat length than the second printed pattern;
wherein the first printed pattern migrates relative to the second printed pattern thereby increasing the variation of the surface covering when the first and second printed layers are joined together.

2. The surface covering as recited in claim 1, wherein the two printed layers are printed on a single substrate.

3. The surface covering as recited in claim 1, wherein the two printed layers are printed on a two separate films which are laminated together.

4. The surface covering as recited in claim 1, wherein the first printed layer is printed on a substrate and the second print layer is printed on a film which is laminated to the substrate.

5. The surface covering as recited in claim 1, wherein the second printed pattern is opaque, preventing the first printed pattern from being seen through the second printed pattern.

6. The surface covering as recited in claim 5, wherein the second printed pattern is a grout pattern.

7. The surface covering as recited in claim 1, wherein the first print layer and the second print layer are adjacent.

8. The surface covering as recited in claim 1, wherein a clear film is provided between the first print layer and the second print layer.

9. A surface covering comprising:
a substrate;
a first print layer comprising a first repeating pattern having a first repeat length; and
a second print layer comprising a second repeating pattern having a second repeat length, the first print layer coupled to the second print layer, the first repeat length being different than the second repeat length so that the first repeating pattern migrates relative to the second repeating pattern.

10. The surface covering of claim 9, wherein the first repeating pattern is a stone pattern and the second repeating pattern is a grout line pattern.

11. The surface covering of claim 9, wherein the second print layer is opaque.

12. The surface covering of claim 9, wherein the second print layer is translucent.

13. The surface covering of claim 9, wherein the grout line pattern forms a boundary around the stone pattern.

14. The surface covering of claim 13, further comprising sub patterns.

15. The surface covering of claim 14, wherein the sub patterns comprise smaller stone patterns.

16. The surface covering of claim 9, wherein the first print layer comprises a pigment.

17. The surface covering of claim 9, wherein the surface covering is a tile.

* * * * *